United States Patent [19]

Gouley

[11] 4,195,300
[45] Mar. 25, 1980

[54] DEVICE FOR SIMULATING THE LOCATING SIGNALS OF AN ILS BEACON

[75] Inventor: Claude A. Gouley, Cugnaux, France

[73] Assignee: Societe Nationale Industrielle Aerospatiale, Paris, France

[21] Appl. No.: 923,930

[22] Filed: Jul. 13, 1978

[30] Foreign Application Priority Data

Jul. 20, 1977 [FR] France .............................. 77 22212

[51] Int. Cl.² .............................................. G01S 1/24
[52] U.S. Cl. ..................................... 343/109; 35/10.4
[58] Field of Search ......................................... 343/109

[56] References Cited

U.S. PATENT DOCUMENTS 4,068,236   1/1978   Alford ................................ 343/109

Primary Examiner—Maynard R. Wilbur
Assistant Examiner—Richard E. Bergen
Attorney, Agent, or Firm—Merriam, Marshall & Bicknell

[57] ABSTRACT

The present invention relates to a device for simulating the locating signals of an I L S beacon, said device comprising on the one hand two chains in parallel respectively intended for generating sinusoidal modulation I L S signals, each comprising a digital generator for one of said signals and a digital analog converter provided with an input for controlling the reference amplitude of its output voltage and, on the other hand, an at least partially digital arrangement for producing reference voltages for said inputs for controlling the digital/analog converters. The invention is applicable for testing apparatus on board an aircraft.

9 Claims, 2 Drawing Figures

DEVICE FOR SIMULATING THE LOCATING SIGNALS OF AN ILS BEACON

The present invention relates to a device for simulating locating signals emitted by an I L S beacon of known type (Instrument Landing System). Such a device is intended to test the apparatus on board an aircraft for example, adapted to receive and exploit the signals emitted by an I L S beacon to determine the position of said aircraft with respect to said beacon.

It is known that, with a view to determining the position of an aircraft with respect to the longitudinal axis of an aerodrome runway, an I L S beacon comprises an antenna system, of which the radiation pattern comprises two elongated lobes, symmetrical with respect to said runway axis, one of the lobes corresponding to a high frequency signal carrying a sinusoidal modulation signal at 90 Hz, the other lobe corresponding to a high frequency signal carrying a sinusoidal modulation signal at 150 Hz. The emission powers of the two lobes are equal. Thus, according to whether the aircraft is located to the left or to the right of the axis of the runway, the amplitude of one of the modulation signals received by the aircraft is greater than that of the other of said signals, and vice versa. When the aircraft is just in the axis of the runway, the amplitudes of these modulation signals are equal. It is therefore easily understood that such a beacon is particularly useful when an aircraft is landing.

It is therefore particularly important that the apparatus on board the aircraft are tested and adjusted with a strict precision, particularly in amplitude.

It is an object of the present invention to provide a device for simulating I L S locating signals allowing such a test and such an adjustment, as it offers, due to its structure, a strict precision of amplitude.

To this end, according to the invention, the device for simulating the locating signals of an I L S beacon, comprising an antenna system, of which the radiation pattern comprises two elongated lobes, symmetrical with respect to a longitudinal axis, each of said lobes corresponding to a high frequency signal carrying a low frequency sinusoidal modulation signal, said low frequencies being different from each other and specific of the lobe to which they correspond, is noteworthy in that it comprises on the one hand, two chains in parallel, respectively intended for the generation of said sinusoidal modulation signals and each comprising a digital generator for producing one of said signals and a digital/analog converter provided with an input for controlling the reference amplitude of its output voltage and, on the other hand, an at least partially digital arrangement to produce reference voltages for said inputs for controlling the digital/analog converters.

Thus, due to such a structure, for a large part digital, it is possible to control, with precision, the amplitude of said sinusoidal modulation signals.

These generators, when they are intended to produce a sinusoidal signal of frequency f, by means of the synthesis of N dots per period, each comprise a first forward-backward counter receiving from a clock a signal of frequency at least approximately equal to N.f and transmitting its state to a memory in which to each of these states there corresponds a logic level 1 or 0 according to whether or not it is necessary to increment the preceding totalised value to follow the most faithfully the function to be synthesized, a second forward-backward counter totalizer receiving this logic level 1 or 0 and a logic controlling said first and second forward-backward counter for forward counting or backward counting. The first forward-backward counter alternately counts the first N/4 clock pulses, and counts down the following N/4 clock pulses, whilst, in a cycle of N clock pulses, the second forward-backward counter counts during the first N/4 clock pulses, counts down during the following 2.N/4 clock pulses, and counts again during the N/4 clock pulses following these 2.N/4 pulses. The increment by which the preceding totalised value must or must not be increased may be constituted by said logic level 1 or 0.

The arrangement intended to produce the reference voltages for the digital/numerical converters advantageously comprises a resistor network connected to a supply voltage and comprising n resistors in parallel through which currents of intensity $i_0$, $i_0/2$, $i_0/4$ ... $i_0/2^n$ respectively pass, said resistors each being able to be connected by bistable switches controlled at one or the other of a first or of a second output terminal, possibly by means of current/voltage converters, said second output terminal moreover receiving an additional current $i_0/2^n$.

Thus, by maintaining the switch which is connected to the resistor through which passes the current of intensity $i_0$, in its position of connection to the first terminal and by connecting the other switches either to the first terminal, or to the second terminal, it is possible to obtain thereon voltages respectively equal to $V+\Delta V$ and $V-\Delta V$, the variation $\Delta V$ being adjustable by tipping certain of said other switches.

The outputs of the digital/analog converters of the two chains are connected to an adder.

It is advantageous if the two chains are controlled in parallel by a common pilot oscillator of which the frequency is equal to the product of the lowest common multiple of the low frequencies $f_1$ and $f_2$ of the two sinusoidal modulation signals and of the number N of the dots of synthesis per period of said signals.

In this case, it is indispensable to provide in each chain, upstream of the digital generator, a digital divider adapted to supply said generator with the frequency $N.f_1$ or $N.f_2$ which corresponds thereto.

However, as the above-described arrangement furnishes voltages $V+\Delta V$ and $V-\Delta V$, to be able to simulate both the case where the amplitude of the modulation signal of highest frequency is greater than the amplitude of the modulation signal of lowest frequency and the case of the amplitude of lowest frequency being greater than the amplitude of the signal of highest frequency, it is indispensable that each digital divider comprises two ratios of division so that each of the chains can produce one or the other of said low frequencies $f_1$ or $f_2$, so that, when one of the chains produces the modulation signal of frequency $f_1$, the other chain simultaneously produces the modulation signal of frequency $f_2$, and vice versa.

In order tp be able to simulate a "phase shift" between the two sinusoidal modulation signals, the device according to the invention comprises a digital phase converter with control inputs, disposed between the two chains and capable, from the passage through the 0 degree phase of the sinusoidal modulation signal produced by one of the digital generators, to initialize the other sinusoidal modulation signal with a variable delay. Such a phase converter is advantageously constituted by a digital counter with programmable counting value.

Such a counter, on the one hand, counts the pulses which arrive from a third divider connected to one of said digital generators and presenting, as desired, two ratios of division equal to those of said chain dividers and, on the other hand, is controlled by a fourth divider connected to one of said chain dividers, the radios of division of said third and fourth dividers being simultaneously equal to each other and inverse of the ratio of division of the divider of the chain from which they receive their data.

The invention will be more readily understood on reading the following description with reference to the accompanying drawings, in which.

Figure 1:
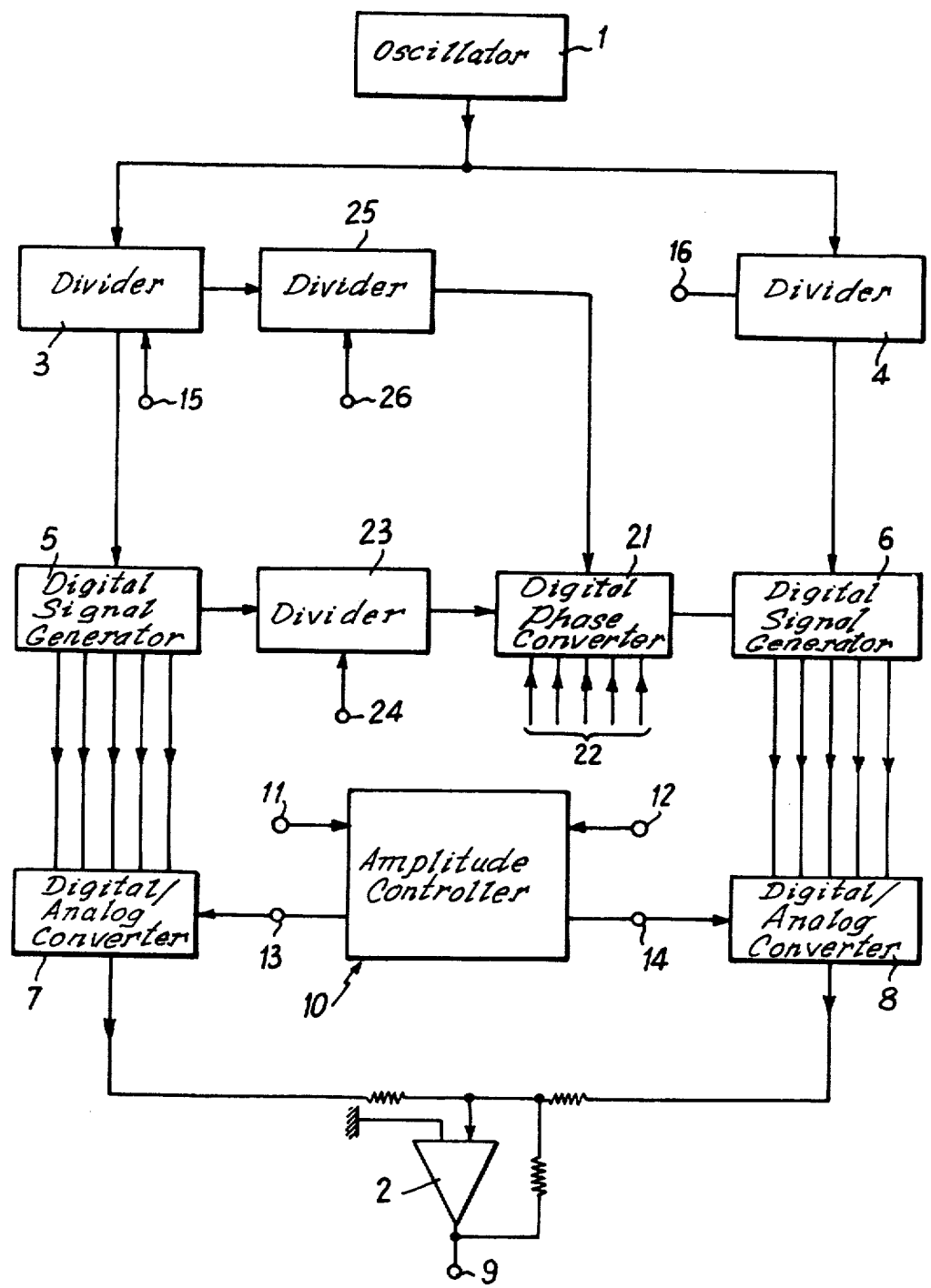
FIG. 1 is a block diagram illustrating the structure of an I L S simulating device according to the invention.

Referring now to the drawings, the I L S simulator shown in FIG. 1 allows the generation of two sinusoidal signals, at 90 and 150 Hz respectively, the relative amplitudes of which may be adjusted very precisely, since this simulator essentially comprises a digital structure. Moreover, this simulator makes it possible to adjust the phase of these two sinusoidal signals with respect to their common subharmonic at 30 Hz. The gist of the present invention is to produce in digital manner the two sinusoidal signals, this enabling the level of said signals to be very precisely controlled with the aid of a D.C. voltage applied to the reference input of the digital/analog converters, provided downstream of said digital generators.

To this end, the simulator of FIG. 1 comprises, between a high frequency pilot oscillator 1 and an operational amplifier 2 mounted as adder, two generation chains mounted in parallel, said oscillator 1 and said adder 2 being common to the two chains.

Each chain comprises a programmable divider 3 or 4 receiving the pulses from the pilot generator 1, a digital generator of sinusoidal signal 5 or 6 controlled by said divider 3 or 4, and a digital/analog converter 7 or 8 receiving the signals from the generator 5 or 6 and transmitting its own analog signals to the adder 2, at the output 9 of which appears a signal simulating that of an I L S beacon. Between the two chains 3,5,7 and 4,6,8 is disposed an amplitude control device 10, the inputs 11 and 12 of which receive reference signals and the outputs 13 and 14 of which control the reference inputs of the converters 7 and 8.

The pilot oscillator 1 produces a signal of frequency equal to 3600 to 450 Hz, in the case of a synthesis by 10th of degree being desired for the generation of the sinusoidal signals, this frequency being 3600 times the smallest common multiple of 90 and 150 Hz. The signal of the oscillator is transmitted to the dividers 3 and 4. These programmable dividers are identical and may each divide the frequency of the oscillator 1 by 3 and by 5 according to the orders sent onto their control inputs 15 and 16. Only the control (not shown) of the programmable dividers 3 and 4 is wired so that when the divider 3 divides by 3 the divider 4 divides by 5, whilst, when the divider 3 divides by 5, the divider 4 divides by 3. Thus, the generators 5 and 6 receive signals whose frequency is either 3600×90 or 3600×150, so that, when one receives the first frequency, the other receives the second, and vice versa.

This results in the generator 5 generating a digital sinusoidal signal at 150 Hz when the generator 6 generates a digital sinusoidal signal at 90 Hz and vice versa. These digital sinusoidal signals are converted into analog signals by the converters 7 and 8, respectively, and their sum appear at the output 9.

The device 10 is intended to vary the amplitude of the modulation signals at 90 or 150 Hz about a situation for which the amplitudes are equal, in order to simulate an aircraft position out of true with respect to the axis of the aerodrome runway.

Figure 2:
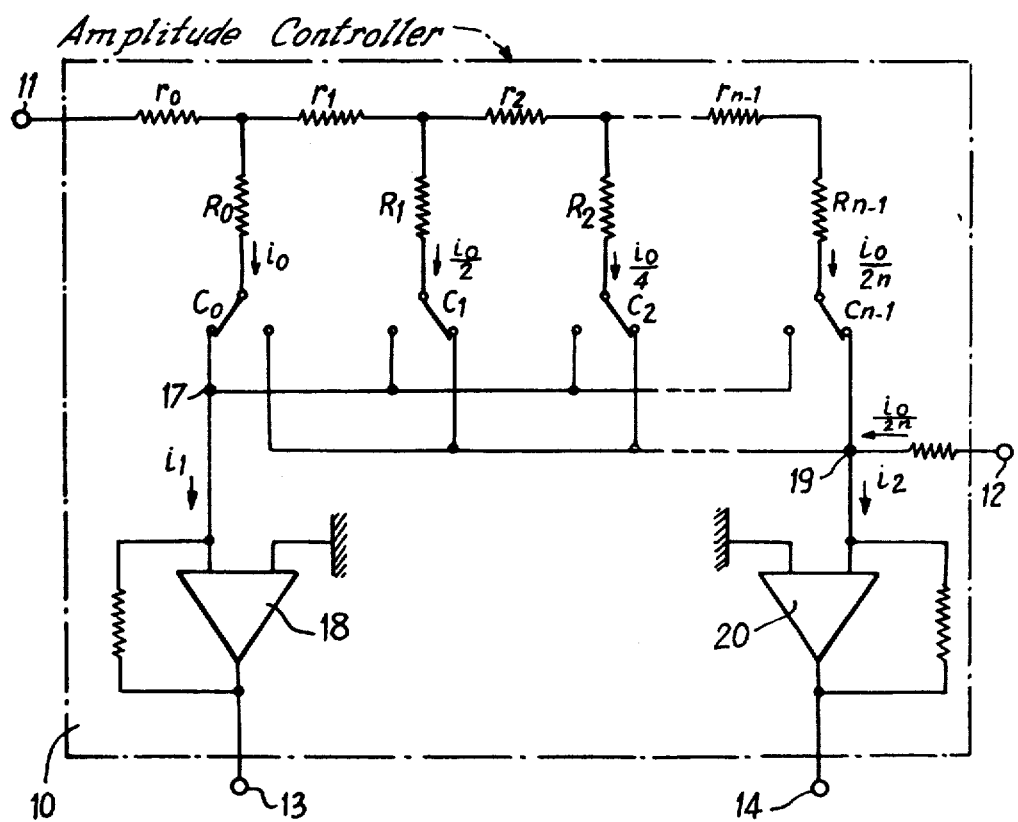
FIG. 2 is the diagram of a digital/analog converter for varying the amplitude of the modulation signals.

FIG. 2 shows an embodiment for the device 10 for controlling the amplitude of the signals at 90 and 150 Hz, capable of producing at its outputs 13 and 14 control voltages $V+\Delta V$ and $V-\Delta V$, applied on the reference inputs of the digital/analog converters 7 and 8

To this end, the device 10 comprises a multiple network of resistors comprising n resistors $R_0$ to $R_{n-1}$ mounted in parallel and n resistors $r_0$ to $r_{n-1}$ connecting the resistors $R_0$ to $R_{n-1}$ together in twos at one of their ends, the resistor $r_0$ connecting the whole of the network to the terminal 11. At their end opposite the resistors $R_0$ to $R_{n-1}$, the resistors $R_0$ to $R_{n-1}$ are connected to bistable switches $C_0$ to $C_{n-1}$. One of the positions of all the switches $C_0$ to $C_{n-1}$ is connected to an input 17 of an operational amplifier 18 functioning as current-/voltage converter; the other position of all the switches $C_0$ to $C_{n-1}$ is connected to an input 19 of an operational amplifier 20, also functioning as a current-/voltage converter. The outputs of the operational amplifiers 18 and 20 constitute the outputs 13 and 14 of the device 10, whilst the input 19 of the operational amplifier 20 is connected to the input terminal 12.

The network of resistors $R_0 - R_{n-1}$ and $r_0 - r_{n-1}$ is such that, when an adequate reference voltage is sent onto the terminal 11, the resistor $R_0$ has a current $i_0$ passing therethrough, the resistor $R_1$ a current $i_0/2$, the resistor $R_2$ a current $i_0/4$, etc..., the resistor $R_{n-1}$ a current $i_0/2^n$. Moreover, there is applied on the terminal 12 an additional reference signal producing a current of intensity $i_0/2^n$, directed towards the input 19.

Thus, when the different switches $C_0$ to $C_{n-1}$ occupy the positions shown in FIG. 2, i.e. the switch $C_0$ connects the resistor $R_0$ to the input 17 of the operational amplifier 18, whilst all the other switches $C_1$ to $C_{n-1}$ connect the resistors $R_1$ to $R_{n-1}$ to the input 19 of the operational amplifier 20), the operational amplifier 18 receives an input current $i_1$ equal to $i_0$, whilst the operational amplifier 20 receives an input current $i_2$, such that $$i_2 = \frac{i_0}{2} + \frac{i_0}{4} + \ldots + \frac{i_0}{2^n} + \frac{i_0}{2^n}$$

A      B in which the sum A comes from the part of network $R_1$ to $R_{n-1}$ and the term B from the reference terminal 12.

It will easily be verified that the sum $A+B$ is equal to $i_0$, i.e. $i_2 = i_0$.

Therefore, for the positions of switches $C_0$ to $C_{n-1}$ shown in FIG. 2, $i_1 = i_2 = i_0$. This results in the control voltages which appear at the outputs 13 and 14 being equal to one another and to a common value V.

On the other hand, if, from the positions of switches shown in FIG. 2, one or more switches $C_1$ to $C_{n-1}$ are made to tip, the switch $C_0$ remaining constantly in the position shown, it is easily imagined that the input current $i_1$ of the operational amplifier 18 becomes $i_1 = i_0 + \Delta i$, whilst the input current $i_2$ of the operational amplifier 20 becomes $i_2 = i_0 - \Delta i$. The voltages at the output terminals 13 and 14 have therefore respectively become equal to $V + \Delta V$ and $V - \Delta V$. Of course, the amplitude of $\Delta i$, and therefore that of $\Delta V$, depends on the number and row of two or that of the switches $C_1$ to $C_{n-1}$ which have tipped with respect to the positions of FIG. 2.

Thus, the two control voltages elaborated by the device 10 appearing respectively at the terminals 13 and 14 thereof are such that their sum is constant (equal to 2V) and their difference ($2\Delta V$) is directly proportional to the digital value furnished by the network $R_0 - R_{n-1}$ and $r_0 - r_{n-1}$, the value $\Delta V$ always being zero or positive.

The digital/analog converter 7 which receives from the digital generator 5 a sinusoidal signal, for example of the type $\cos \omega_1 t$, with $\omega_1 = 2\pi f_1$, $f_1$ being equal to 150 or 90 Hz, therefore supplies at its output a signal of type $(V + \Delta V) \cos \omega_1 t$.

Similarly, the digital/analog converter 8, which receives from the digital generator 6 a sinusoidal signal, for example of the type $\cos \omega_2 t$, with $\omega_2 = 2\pi f_2$, $f_2$ being equal to 90 or 150 Hz, therefore supplies at its output a signal of the type $(V - \Delta V) \cos \omega_2 t$.

At the output 9, an I L S simulation signal is therefore collected, of the type $(V + \Delta V) \cos \omega_1 t + (V - \Delta V) \cos \omega_2 t$.

Of the two voltages $V + \Delta V$ and $V - \Delta V$, the first will always be equal to or greater than the second; consequently, the sinusoidal signal appearing at the output of the converter 7 will always be of amplitude equal to or greater than the sinusoidal signal appearing at the output of the converter 8. Thus, if the chain 3,5,7 were rigidly associated with the generation of a signal at 150 Hz and the chain 4,6,8 were rigidly associated with the generation of a signal at 90 Hz, the signal at 150 Hz would always have an amplitude greater than the signal at 90 Hz.

It is in order to be able to simulate the inverse case where the signal at 90 Hz has an amplitude greater than the signal at 150 Hz, that the dividers 3 and 4 are each provided to have two ratios of division, namely 3 and 5. Thus, the chain 3,5,7 may produce the signal at 90 (or 150) Hz of higher or equal amplitude, whilst the chain 4,6,8 may simultaneously produce the signal at 150 Hz (or 90 Hz) of lower or equal amplitude, according to the choice of the ratios of division of the dividers 3 or 4. By simple inversion of these ratios of division, it is therefore possible to obtain either the case of the amplitude of the signal at 90 Hz being greater than or equal to that of the signal at 150 Hz, or the inverse case.

The simulated position of an aircraft is translated not only by a difference in amplitude between the signals at 90 Hz and at 150 Hz, but also by a phase shift $\theta$ of one of the signals with respect to the other. To this end, the phase control in the simulator according to the invention is effected by a digital phase converter 21, constituted by a counter with programmed counting value, at the input 22 of which it is possible to introduce phase shifts $\theta$, so that the signal actually appearing at the output of the converter 8 is of the type $(V - \Delta V) \cos (\omega_2 t + \theta)$ and not only of the type $(V - \Delta V) \cos \omega_2 t$, as mentioned previously. The simulated I L S signal at the output 9 therefore presents the form $(V + \Delta V) \cos \omega_1 t + (V - \Delta V) \cos (\omega_2 t + \theta)$ The digital phase converter 21 produces a delay $\theta$ between the pulse of passage to the 0 degree phase of the sinusoidal signal of major amplitude (the one produced by the chain 3,5,7) and the pulse of initiation to the 0 degree phase of the sinusoidal signal of minor amplitude (the one produced by the chain 4,6,8). However, for the phase shift value $\theta$ to be independent of the ratio of division (3 or 5) of the divider 3, it is necessary to take into account, for the phase shift, only a single pulse every thirtieth of second (30 being the highest common factor of 150 and 90). Consequently, a divider 23 is provided, of which the ratio of division is 3 or 5 according to the value of the ratio of division of the divider 3 each time the product of said ratios of division being equal to 15, i.e. when the ratio of division of the divider 3 is equal to 3, that of the divider 23 is equal to 5, and vice versa. The choice of the ratio of division of the divider 23 is made by means of the control terminal 24. Moreover, the phase converter 21 must be synchronised by a clock whose frequency must be $3600 \times 30$ Hz so that the phase may be controlled by tenth of degree with respect to the common subharmonic at 30 Hz. This is effected by means of a divider 25 with two ratios of division 3 or 5 which may be chosen from a control terminal 26. When the ratio of division of the divider 3 is equal to 3, that of the divider 25 is equal to 5 and vice versa.

Thus, the device controlling the phase shift comprises on the one hand the phase converter 21 controlling the generator 6 and itself controlled by the divider 23 which receives from the generator 5 a pulse of passage through 0 of the sinusoidal signal produced by this latter, and, on the other hand, the divider 25 receiving the output signal from the divider 3 and synchronising the functioning of the phase converter 21.

It will be noted that the switching between the frequencies 90 Hz and 150 Hz at the level of the generation makes it possible to maintain in the device 10 the heavy weight (resistor $R_0$—switch $C_0$) of the digital signal elaboring the two control voltages $V + \Delta V$ and $V - \Delta V$ applied on the input 17 of the operational amplifier 18. Thus, by construction, a strict equality may be obtained between the differences in modulation for the amplitude of signal at 90 Hz greater or lower than that of the signal at 150 Hz. Moreover, near the zero value of $\Delta V$, where considerable precision is demanded of an I L S simulator, only the low weights (resistors $R_1$ to $R_{n-1}$ switch $C_1$ to $C_{n-1}$) are used. For this use, a digital-analog converter 10 may thus be used, of which the precision is much less than its resolution and which is consequently inexpensive.

Moreover, it will be noted that with the device according to the invention, the sum of the amplitudes of the two sinusoidal signals remains constant whatever the value of amplitude difference chosen and may be rendered variable by acting on the reference signals applied on the control terminals 11 and 12 of the device 10.

What I claim is:

1. A device for simulating the locating signals emitted by an ILS beacon having a radiation pattern comprising two elongated lobes, each of which lobes is symmetrical with respect to a longitudinal axis and corresponds to a high frequency signal carrying a low frequency sinusoidal modulation signal, said low frequencies being different from each other and each being specific to the lobe to which it corresponds, said device comprising two chains in parallel respectively adapted for the generation of said sinusoidal modulation signals, wherein each chain comprises a digital generator for one of said signals and a digital/analog converter provided with an input for controlling the reference amplitude of its output voltage and wherein said device comprises an at least partially digital arrangement for producing reference voltages applied to said inputs for controlling said digital/analog converters.

2. A device according to claim 1, in which the arrangement for producing said reference voltages comprises a resistor network connected to a supply voltage and comprising n resistors in parallel through which currents of intensity $i_0$, $i_0/2$, $i_0/4$ ... $i_0/2^n$ respectively pass, wherein each said resistor is connected by bistable switches controlled at one or the other of a first or of a second output terminal, by means of current/voltage converters, said second output terminal moreover receiving an additional current $i_0/2^n$.

3. A device according to claim 2, wherein the switch which is connected to the resistor through which the current of intensity $i_0$ passes, is maintained in its position of connection to the first terminal, whilst the other switches are connected either to the first terminal or the second terminal, so as to obtain, due to current/voltage converters, voltages respectively equal to $V+\Delta V$ and $\Delta V - \Delta V$, the variation $\Delta V$ being adjustable by tipping certain of said other switches.

4. A device according to claim 1 wherein the outputs of the digital/analog converters of the two chains are connected to an adder.

5. A device according to any one of claims 1 to 4, wherein the two chains are controlled in parallel by a common pilot oscillator of which the frequency is equal to the product of the lowest common multiple of the low frequencies $f_1$ and $f_2$ of the two sinusoidal modulation signals and of the number N of the dots of synthesis per period of said signals and wherein, in each chain, upstream of the digital generator, a digital divider is provided which is capable of supplying to said generator the frequency $Nf_1$ or $Nf_2$ corresponding thereto.

6. A device according to claim 5, wherein each digital divider comprises two ratios of division so that each of the chains may produce one or the other of said low frequencies $f_1$ or $f_2$, so that, when one of the chains produces the modulation signal of frequency $f_1$, the other chain produces simultaneously the modulation signal of frequency $f_2$, and vice versa.

7. A device according to claim 6, wherein it comprises a digital phase converter with control inputs, disposed between the two chains and capable, from the passage through the 0 degree phase of the sinusoidal modulation signal produced by one of the digital generators, to initialize the other sinusoidal modulation signal with a variable delay.

8. A device according to claim 7, wherein the phase converter is constituted by a digital counter with programmable counting value.

9. A device according to claim 6, wherein the counter, on the one hand, counts the pulses which arrive from a third divider connected to one of said digital generators and presenting, as desired, two ratios of division equal to those of said chain dividers and, on the other hand, is controlled by a fourth divider connected to one of said chain dividers, the ratios of division of said third and fourth dividers being simultaneously equal to each other and inverse of the ratio of division of the divider of the chain from which they receive their data.

* * * * *